United States Patent [19]

Oppolzer

[11] 4,161,370

[45] Jul. 17, 1979

[54] WINDMILL

[76] Inventor: Gottfried Oppolzer, Geylinggasse 15, A-1130 Vienna, Austria

[21] Appl. No.: 895,447

[22] Filed: Apr. 11, 1978

[30] Foreign Application Priority Data

Apr. 18, 1977 [AT] Austria ................................ 2683/77
Feb. 1, 1978 [AT] Austria ................................. 680/78

[51] Int. Cl.² ............................................. F03D 3/02
[52] U.S. Cl. ...................................... 416/17; 416/121; 416/122; 416/5
[58] Field of Search ..................... 416/17, 117, 122, 5, 416/118, 197 A, 121 A

[56] References Cited

U.S. PATENT DOCUMENTS

| 320,654 | 6/1885 | Harrison ...................... 416/121 A X |
| 622,420 | 4/1899 | Fisher ............................... 416/117 X |
| 910,342 | 1/1909 | Wood .............................. 416/117 X |
| 1,025,399 | 5/1912 | Holmström ...................... 416/240 X |
| 1,087,586 | 2/1914 | Ivancevich ................... 416/197 A X |

FOREIGN PATENT DOCUMENTS

| 22964 | 4/1918 | Denmark ............................. 416/121 A |
| 300424 | 9/1917 | Fed. Rep. of Germany ........... 416/117 |
| 810500 | 8/1951 | Fed. Rep. of Germany ....... 416/121 A |
| 69222 | 4/1928 | Sweden .................................. 416/117 |

Primary Examiner—Everette A. Powell, Jr.
Attorney, Agent, or Firm—Kurt Kelman

[57] ABSTRACT

First and second windmill wheels are mounted on and non-rotatably connected by shaft means, which define a vertical axis. Each of said windmill wheels has rigidly interconnected vanes, which are adapted to return opposite to the direction of the wind. Said two windmill wheels define axially outermost flight circle planes which intersect at an acute angle. The vanes of each of said windmill wheels are adapted to describe an orbital line, which is tangent to a corresponding orbital line described by the vanes of the other windmill wheel at an apex, which is disposed between said flight circle planes. Control means are operable to move said windmill wheels relative to each other so as to move said apex about said vertical axis and thus to vary said angle when measured in a vertical plane that is at right angles to the direction of the wind. Said vanes of each of said windmill wheels interdigitate with those of the other windmill wheel adjacent to said apex so that said vanes shelter each other from the wind as they return when said apex lies in said vertical plane.

18 Claims, 5 Drawing Figures

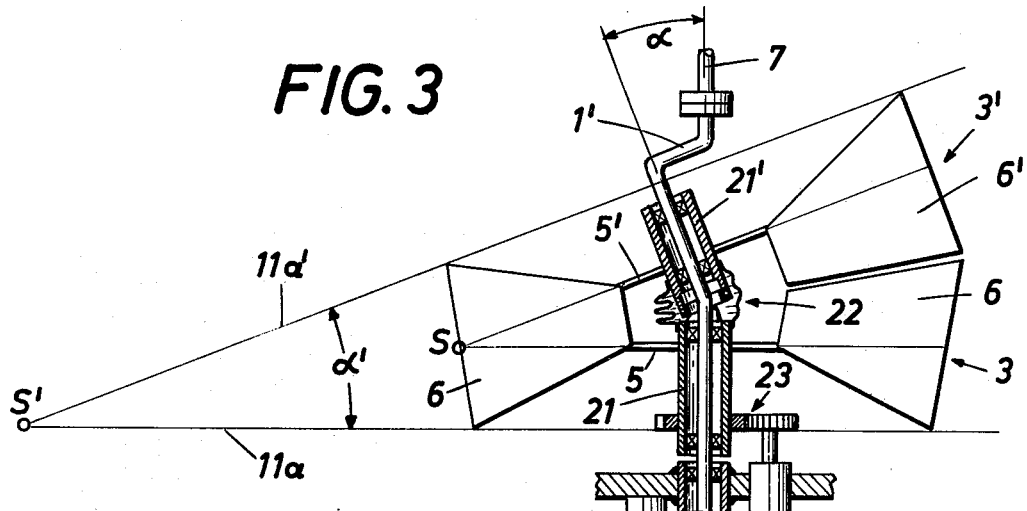
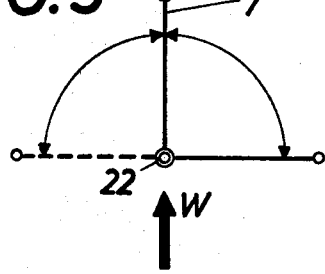
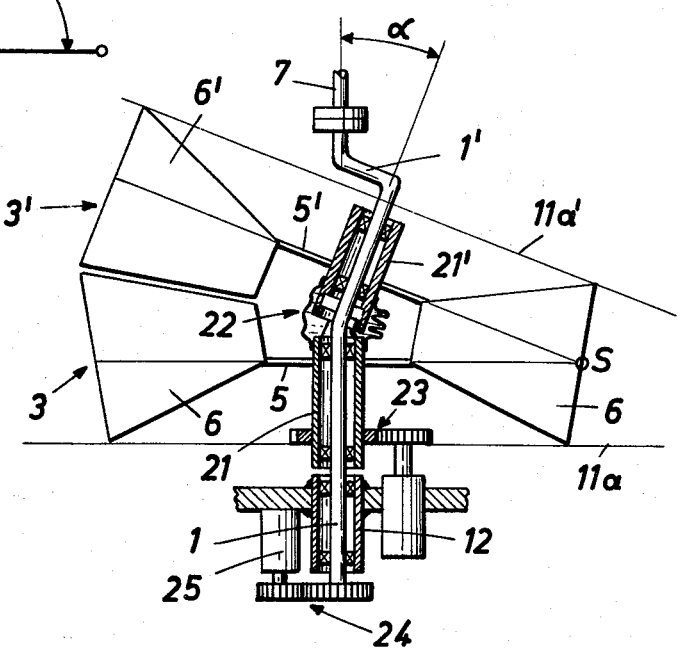

WINDMILL

This invention relates to a windmill, comprising two windmill wheels arranged one over the other for rotation on a vertical axis and having freely revolvable, rigidly secured vanes, which return opposite to the direction of the wind.

The known windmills of that kind have a poor efficiency and cannot easily be controlled because the vanes are rigid with the windmill wheel. Whereas windmill wheels having vanes which are rotatable about their axes permit of an improved control in dependence on the wind speed, such windmill wheels are complicated and liable to be deranged.

It is an object of the invention to avoid these disadvantages and to provide a windmill which has a simple, rugged structure, can easily be controlled at different wind speeds, and has a much higher efficiency.

This object is accomplished according to the invention in that at least two windmill wheels are provided, the axially outermost flight circles of which lie in respective flight circle planes, which in a vertical section plane that is at right angles to the direction of the wind intersect at an adjustable acute angle, each of said windmill wheels has vanes, which are adapted to describe an orbital line, which is tangent to a corresponding orbital line described by the vanes of an adjacent one of said windmill wheels at an apex, which is disposed between said flight circle planes, and said vanes of adjacent ones of said windmill wheels interdigitate adjacent to said apex to shelter each other from the wind as said vanes return.

To adjust the acute angle in the above-mentioned vertical section plane, which is at right angles to the direction of the wind, the shaft of the upper windmill wheel is rotated about the vertical shaft of the lower windmill wheel whereas a constant inclination between the two shafts is maintained. In case of a direct control this is accomplished by means of a rudder, which is pivotally movable about the vertical axis of rotation and tends to hold the apex adjacent to a diametral plane which is at right angles to the direction of the wind, and said rudder is connected to an auxiliary control frame, which preferably receives the lower windmill wheel, which rotates in a horizontal plane, and said frame is adapted to include an adjustable angle up to 90° with the rudder on either side thereof and is secured to a bearing body, which is disposed between the two windmill wheels and is provided with a lower bearing which engages the vertical shaft of the lower windmill wheel, and an upper bearing which engages the shaft of the upper windmill wheel, and the shaft of the upper windmill wheel includes a constant, acute angle of inclination with the vertical shaft and is non-rotatably connected to the latter.

In accordance with the invention, the auxiliary control frame secured to the bearing body is open at one end toward the shafts and comprises at least one upper radial arm, which extends between the upper and lower windmill wheels and the bearing body is secured to the inner end of said arm.

Because the auxiliary control frame must extend outwardly approximately transversely to the direction of the wind if a high efficiency is to be obtained and the rudder itself must extend in the direction of the wind if the windmill wheels are to be properly stabilized, a direct control requires the use of an angled auxiliary frame or of an auxiliary frame having angled radial arms. From strength and aerodynamical aspects, the frame or its arm must not be angled by more than 45°. The resulting power loss is tolerable in small windmills because it is accompanied by a saving in structural expenditure, but is intolerable in large windmills unless a remote control is adopted which comprises a rudder that is physically separate from the windmill and adjusts the auxiliary control frame to the proper position. On the other hand, such arrangement involves sources of errors and considerably adds to the expenditure.

In order to avoid these disadvantages regarding the rudder-operated control system, another feature of the invention resides in that both windmill wheels are mounted on a continuous axle, which has an upper portion that has the desired angle of inclination from the vertical whereas the vertical lower portion of the axle is rotatably mounted at its end in the stationary support so that the axle can be adjusted in dependence on the direction of the wind, and two hollow shafts are rotatably fitted on said axle and are non-rotatably connected to each other adjacent to the bend of the axle by a non-positive coupling, particularly by a covered torque-transmitting articulated joint, which comprises external pins, each windmill wheel is secured to one of said hollow shafts and the lower hollow shaft is connected at its free end, above the bearing for the axle, to an output transmission. In such a windmill, the end of the controlling rudder may be connected to the upper portion of the continuous axle and may constitute the uppermost part of the windmill and be disposed in an undisturbed zone outside the range of action of the vanes of the upper windmill wheel. The windmill will be automatically and exactly stabilized by the rudder if the leading vertical edge of the latter is aligned with the vertical axis of rotation.

If a servomotor is required in the rudder control system for a large windmill, it is within the scope of the invention to provide a transmission for positioning the axle and to provide the rotatably mounted rudder with a positioning motor for driving the positioning transmission. As all control units of a plant are combined in such rudder-actuated servocontrol system, the latter does not appreciably add to the expenditure, particularly because the rudder and its carrying structure may be much smaller.

The conduits which are required for such control system may extend in the hollow axle, which may also contain the lines leading to the lightning arrester, an antenna and an aircraft-warning light.

Further details and features will become apparent from the following description of the windmill according to the invention with reference to the accompanying drawings which illustrate the invention by way of example.

FIGS. 3 and 4 are diagrammatic axial sectional views showing the windmill of FIG. 2 in operating and braked positions, respectively, and FIG. 5 is a diagrammatic top plan view illustrating the kinematic relations.

Figure 1:
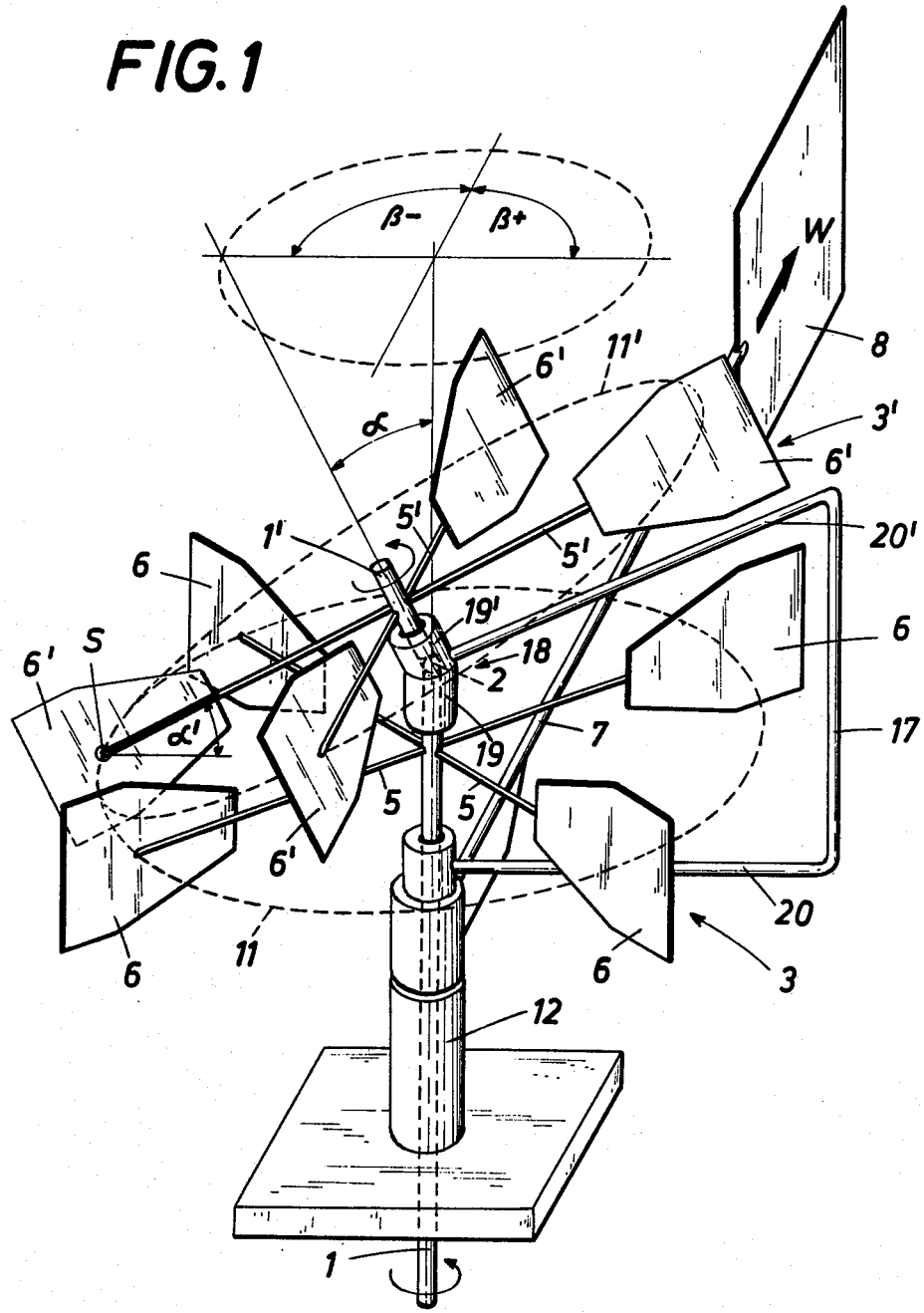
FIG. 1 is a perspective view showing a windmill.

The windmill comprises two windmill wheels 3, 3', which are mounted one over the other on shafts 1, 1', respectively, The shaft 1 defines a vertical axis of rotation. The windmill wheels comprise vanes 5, 6, 5', 6', which can revolve freely and return opposite to the direction W of the wind. In a vertical section plane which is at right angles to the direction of the wind, the axially outermost flight circle planes 11, 11' of the windmill wheels intersect at an acute angle α', which is adjustable. The vanes 5, 6 or 5', 6' of each windmill wheel 3 or 3' are adapted to describe an orbital line, which is tangent to a corresponding orbital line described by the vanes 5', 6' or 5, 6 of the adjacent windmill wheel 3' or 3 at an apex S, which is disposed between the flight circle planes 11, 11'. When the windmill wheels 3, 3' are in operating positions, the vanes 5, 6, 5', 6' interdigitate as they return and thus shelter each other from the wind. A control rudder 7, 8 is pivotally movable about the vertical axis of rotation and maintains the apex S in the diametral plane which is at right angles to the direction of the wind, as is apparent from FIGS. 1 and 2. The lower windmill wheel 3 is disposed in a horizontal plane that is at right angles to the vertical axis defined by the shaft 1. Because the upper windmill wheel 3' is inclined and when it is in its optimum operating position the returning vanes of the windmill wheel 3' interdigitate with those of the other windmill wheel, which rotates in a plane that is at right angles to the vertical axis of rotation, the interdigitating vanes of the windmill wheels shelter each other from the wind so that the power loss which is due to the form drag of the vanes as they return opposite to the wind is much reduced.

Such a system comprising at least one inclined windmill wheel permits of a simple and effective control because an optimum operating position can be adjusted for normal wind conditions, the cooperating windmill wheels can be infinitely adjusted as far as to a parallel position, e.g., at higher wind speeds, and the adjustable windmill wheel may be adjusted beyond the parallel position to an opposite inclination so that a braking action can be obtained in case of a storm. A pivotal movement of the inclined shaft out of the vertical plane which is at right angles to the direction of the wind will result in a change of the angle of inclination α', measured in said vertical plane.

In the embodiment shown in FIG. 1 the control rudder 7, 8 is connected to an adjustable auxiliary control frame 17, which receives the lower windmill wheel 3, which rotates in a horizontal plane. The frame 17 can be adjusted to extend at an angle of up to 90° to the rudder 8 on either side thereof and is secured to a bearing body 18, which is disposed between the two windmill wheels 3, 3'. The bearing body 18 comprises a lower bearing 19, which engages the vertical shaft of the lower windmill wheel 3, and an upper bearing 19', which engages the shaft 1' of the upper windmill wheel 3'. The shaft 1' includes a constant, acute angle of inclination α with the vertical axis defined by the shaft 1 and is non-rotatably connected to the latter. The bearing body 18 may consist of a hollow body, which may be closed or provided with covers, which can be opened for maintenance purposes. A coupling 2 connecting the shafts 1, 1' of the lower and upper windmill wheels 3, 3' is disposed in the bearing body between the two bearings 19, 19' and may consist of a cardan universal joint or a bevel gear train. The auxiliary control frame 17 is secured to the bearing body 18 and is open at one end toward the shafts 1, 1' and has upper and lower radial arms 20, 20'. The bearing body 18 is secured to the inner end of the upper radial arm, which extends between the upper and lower windmill wheels 3, 3'.

To provide for an automatic decrease of the angle of attack β so as to decrease the angle α' during dangerous bursts of wind, the rudder 7 may be connected to the lower radial arm 20 of the auxiliary control frame 17 by torque-transmitting means, which may be resilient or extraneously controlled.

The kinematic system for adjusting the acute angle α' and the angle of attack β is designed so that an angle of attack β=90° will be included between the auxiliary control frame 17 and the rudder 7, 8 when the auxiliary control frame 17 lies in that diametral plane through the shafts or axle 1, 1' and the apex S in which the angle α' between the axially outermost flight circle planes of the upper and lower windmill wheels is at a maximum. A decrease of the angle β measured in the direction of rotation towards the rudder 7, 8 results also in a decrease of the angle α' because the apex S is moved toward the afflux side. The apex S will be in a limiting position, corresponding to a negative angle of attack β, when the torques exerted by the advancing and returning vanes of the windmill wheels balance each other. When the apex is in that limiting position, the windmill can be shut down and the windmill wheels can be held in a safe position of rest because the lifting and shearing torques balance each other.

The embodiment described hereinbefore comprises a rudder-operated control system, which may be used also for an extraneous control. The invention is not restricted to this specific type of rudder but includes also other rudder-operated control systems, which are greatly simplified. For instance, the auxiliary frame 17 may comprise only the upper radial arm 20' and the rudder 8 may be directly attached to the upper radial arm 20' at an angle of about 45°. In that case the lower radial arm 20 of the auxiliary frame 17 and the radial arm 7 for the rudder 8 are omitted. Whereas a windmill provided with this simplified rudder-operated, direct-acting control system cannot be adjusted to a position for shut-down, such position is not required in this case because under the action of dangerous bursts of wind the windmill according to the invention will automatically move to face the direction of the wind, with the apex S foremost, so that the windmill then presents the smallest surface area to the attack of the wind. At the same time the rudder simply yields laterally with respect to the direction of the wind. Besides, the effective surface area of the rudder is smaller than in the position for an optimum power of the windmill. It is apparent that the windmill will be safe in a storm even when the rudder-operated control system has been destroyed.

Figure 2:
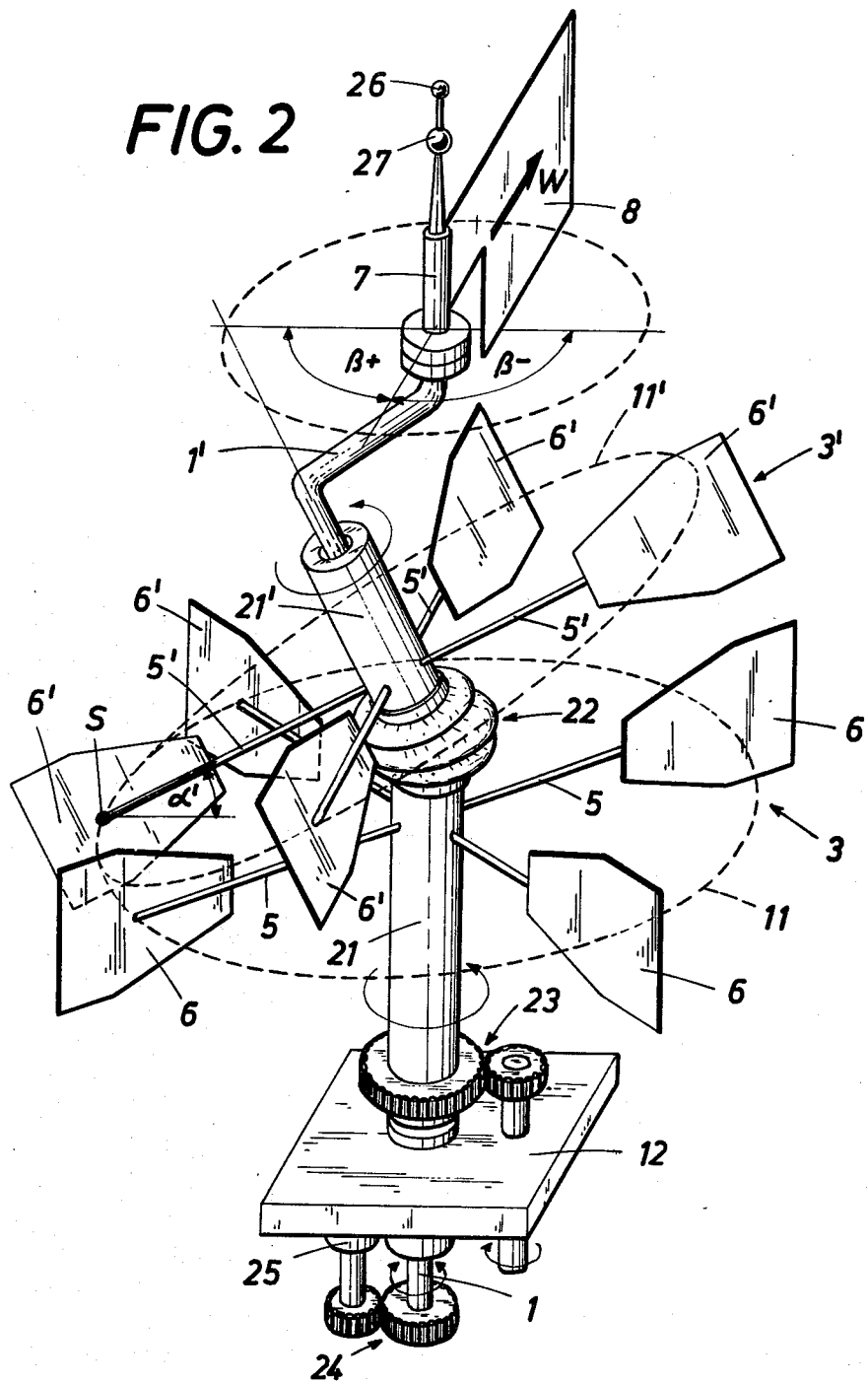
FIG. 2 is another perspective view showing a different embodiment of the windmill.

In the embodiment shown in FIG. 2, a continuous axle 1, 1' is provided for both windmill wheels 3, 3'. The upper portion 1' of the axle includes with the vertical an angle of inclination α. The vertical lower portion 1 of the axle is mounted at its end in a stationary support for rotational adjustment in adaptation to the direction of the wind. Two hollow shafts 21, 21' are rotatably mounted on the axle 1, 1' and adjacent to the bend of the continuous axle 1, 1' are non-rotatably connected by a non-positive coupling consisting preferably of a covered articulated joint 22 having external pins. The windmill wheels 3, 3' are secured to the hollow shafts 21, 21', respectively. The lower hollow shaft 21 is connected at its free end, above the bearing 12 for the axle 1, 1', to an output transmission 23. With this arrangement the control rudder 7, 8 may be mounted on the upper portion 1' of the continuous axle 1, 1' and may constitute the uppermost part of the windmill. The leading vertical edge of the rudder 8 is preferably aligned with portion 1 of the axle. A positioning transmission 24 is provided, which serves to rotate the axle 1, 1', and in semiautomatic windmills may be manually operable. In fully automatic windmills the rudder 7, 8 may be rotatably mounted on the axle 1, 1' on its upper portion 1', where the latter protrudes above the upper hollow shaft 21', and the rudder may be connected to a positioning motor 25, which automatically controls the positioning transmission 24 in adaptation to the direction of the wind. The conduits required for this purpose as well as lines leading to a lightning arrester 26, to an antenna, and to an aircraft-warning light 27, may extend in the interior of the hollow axle 1, 1'.

A simple vane design is shown in FIGS. 2 and 4. The vanes 6, 6' have a trapezoidal configuration and their two parallel outer and inner edges are normal to the angle bisector of the planes in which the two vanes are rotatable whereas the upper and lower sides of the trapezium extend toward the center of the coupling 2 in the bearing body 18 or toward the articulated joint 22. The length of the outer edges which move through the apex S is determined by the planes 11a, 11a' which contain the flight circles described by the axially outer ends of the outer edges of the vanes. The inner edges, which are parallel to the outer edges, are spaced from the center of 2 or 22 (FIGS. 3, 4). The vanes 6, 6' are trapezoidal in elevation and have a camber which depends on the ratio of the peripheral velocity of the wheel to the wind speed and must be determined in dependence on the predominent local conditions. This applies also to the angular range of adjustment of the apex S, which may have to be adjusted considerably to one side or the other of the vertical plane which is at right angles to the direction of the wind in order to achieve an optimum efficiency.

The illustrative embodiments which have been described may be modified in various ways within the scope of the invention. For instance, the windmill wheels may consist of multi-blade propeller wheels or may be provided with high-duty vanes, such as Derrieux vanes. In accordance with FIGS. 1 and 5 the angle of attack $\beta$ between the vertical plane which contains the apex S and the direction of the wind or rudder determines the efficiency of the windmill and will depend on the configuration or sectional shape of the vanes. It is also possible to provide a plurality of windmill wheels on a single axle in such a manner that the returning valves of the wheels interdigitate.

Whereas the basic design embodying the invention may readily be adopted also with axial-flow wheels in various forms, radial-flow wheels embodying the invention are superior to all other types of windmill wheels by having the smallest power-to-weight ratio and by being absolutely safe in a storm.

What I claim is:

1. A windmill comprising
shaft means defining a vertical axis,
first and second windmill wheels mounted on and non-rotatably connected by shaft means, each of said windmill wheels having rigidly interconnected vanes, which are adapted to return opposite to the direction of the wind,
said first and second windmill wheels defining respective axially outermost flight circle planes which intersect at an acute angle,
the vanes of each of said windmill wheels being adapted to describe an orbital line, which is tangent to a corresponding orbital line described by the vanes of the other windmill wheel at an apex, which is disposed between said flight circle planes, and
control means for moving said windmill wheels relative to each other so as to move said apex about said vertical axis and thus to vary said angle when measured in a vertical plane that is at right angles to the direction of the wind,
said vanes of each of said windmill wheels interdigitating with those of the other windmill wheel adjacent to said apex so that said vanes shelter each other from the wind as they return when said apex lies in said vertical plane.

2. A windmill as set forth in claim 1, in which said control means tend to maintain said apex in said vertical plane.

3. A windmill as set forth in claim 1, in which
said shaft means comprise a vertical lower shaft centered on said vertical axis and an upper shaft which is coupled to said lower shaft and includes a constant acute angle of inclination with said vertical axis,
said first and second windmill wheels are secured to said lower and upper shafts, respectively,
a bearing assembly is provided, which comprises a bearing body, a lower bearing engaging said lower shaft, and an upper bearing engaging said upper shaft, and
said control means comprise a pre-adjusting member, which is connected to said bearing body and extends radially therefrom, and a rudder, which is connected to said pre-adjusting member for an angular adjustment within a range of 90° on each side of said pre-adjusting member.

4. A windmill as set forth in claim 3, in which said pre-adjusting member, said vertical axis, and said apex lie in a common vertical plane.

5. A windmill as set forth in claim 3, in which said pre-adjusting member consists of a frame, which receives said first windmill wheel.

6. A windmill as set forth in claim 3, in which
said pre-adjusting member comprises a radial arm, which extends between said first and second windmill wheels, and
said bearing body is secured to the radially inner end of said radial arm.

7. A windmill as set forth in claim 1, in which
said shaft means comprise a lower hollow shaft, and an upper hollow shaft, and a non-positive coupling connecting said shafts,
said first and second windmill wheels are secured to said lower and upper shafts, respectively,
said control means comprise an axle having a lower portion, which is centered on said vertical axis, an upper portion, which includes a constant, acute angle of inclination with said vertical axis, and a bend between said lower and upper portions adjacent to said coupling,
said lower and upper shafts are rotatably mounted on said lower and upper portions, respectively, of said axis,
a stationary support is provided, which is disposed below said lower shaft and in which said axle is mounted for rotation on said vertical axis, and
an output transmission connected to said lower shaft.

8. A windmill as set forth in claim 7, in which said coupling consists of a covered articulated joint having external pins.

9. A windmill as set forth in claim 7, in which said control system comprises a transmission for rotating said axle about said vertical axis.

10. A windmill as set forth in claim 7, in which
said axle has a vertical top portion and
said control system comprises a rudder, which is mounted on said top portion.

11. A windmill as set forth in claim 10, in which said rudder has a leading vertical edge which is aligned with said vertical axis.

12. A windmill as set forth in claim 10, in which said rudder is secured to said top portion.

13. A windmill as set forth in claim 10, in which
said rudder is rotatably mounted on said top portion,
said control means comprise a motor, which is responsive to the rotation of said rudder about said top portion, and a transmission which is connected to said axis and operable by said motor to rotate said axle about said vertical axis.

14. A windmill as set forth in claim 13, in which said axle is hollow and contains conduit means connecting said motor and transmission.

15. A windmill as set forth in claim 7, in which said axle is hollow and has a top portion carrying an electrical fixture and contains a line electrically connected to said fixture.

16. A windmill as set forth in claim 15, in which said electrical fixture consists of a lightning arrester.

17. A windmill as set forth in claim 15, in which said electrical fixture consists of an antenna.

18. A windmill as set forth in claim 15, in which said electrical fixture consists of an aircraft-warning light.

* * * * *